(12) United States Patent
Eckmann et al.

(10) Patent No.: US 10,370,027 B2
(45) Date of Patent: Aug. 6, 2019

(54) STEERING SYSTEM FOR A TRAILING AXLE OF A VEHICLE

(71) Applicant: Robert Bosch Automotive Steering GmbH, Schwäbisch Gmünd (DE)

(72) Inventors: Kai Eckmann, Mutlangen (DE); Stefan Häussler, Leinzell (DE); Falk Hofmann, Bühlerzell (DE); Michael Hägele, Aalen (DE)

(73) Assignee: Robert Bosch Automotive Steering GmbH, Schwäbisch Gmünd (DE)

( * ) Notice: Subject to any disclaimer, the term of this patent is extended or adjusted under 35 U.S.C. 154(b) by 148 days.

(21) Appl. No.: 15/514,547

(22) PCT Filed: Aug. 26, 2015

(86) PCT No.: PCT/EP2015/069495
§ 371 (c)(1),
(2) Date: Mar. 27, 2017

(87) PCT Pub. No.: WO2016/045896
PCT Pub. Date: Mar. 31, 2016

(65) Prior Publication Data
US 2017/0217482 A1    Aug. 3, 2017

(30) Foreign Application Priority Data

Sep. 25, 2014  (DE) .................. 10 2014 113 880

(51) Int. Cl.
*B62D 5/06*    (2006.01)
*B62D 5/08*    (2006.01)
(Continued)

(52) U.S. Cl.
CPC ............. *B62D 5/064* (2013.01); *B62D 5/081* (2013.01); *B62D 5/12* (2013.01); *B62D 7/144* (2013.01); *B62D 15/021* (2013.01)

(58) Field of Classification Search
CPC .......... B62D 5/12; B62D 5/064; B62D 5/081; B62D 7/144; B62D 15/021
(Continued)

(56) References Cited

U.S. PATENT DOCUMENTS 5,839,527 A * 11/1998 Elser ...................... B62D 7/144
180/24.01
6,341,251 B1 * 1/2002 Enomoto ............... B62D 7/144
701/41

FOREIGN PATENT DOCUMENTS

DE    4414161    11/1995
DE    19803745    8/1999
(Continued)

OTHER PUBLICATIONS

International Search Report for Application No. PCT/EP2015/069495 dated Oct. 28, 2015 (English Translation, 2 pages).

*Primary Examiner* — Kevin Hurley
*Assistant Examiner* — Felicia L. Brittman
(74) *Attorney, Agent, or Firm* — Michael Best & Friedrich LLP

(57) ABSTRACT

This invention is a steering system for a trailing or leading axle of a vehicle including a steering angle sensor, a driving speed sensor, an electric motor that drives a hydraulic pump, a working cylinder for steering wheels of the axle, which is joined to the hydraulic pump, a control device which determines a trailing angle of the wheels and which controls the electric motor, wherein the working cylinder has a center position borehole via which hydraulic fluid is emitted, and a piston seals the center position borehole in the straight position of the wheels, wherein the working cylinder is connected to return valves, via which hydraulic fluid can flow back into a tank, wherein the center position borehole is connected to a center position valve, via which hydraulic (Continued)

fluid can flow back into a tank, and wherein the return valves and the center position valve are poppet valves.

6 Claims, 2 Drawing Sheets

(51) Int. Cl.
    *B62D 7/14*     (2006.01)
    *B62D 5/12*     (2006.01)
    *B62D 15/02*     (2006.01)

(58) Field of Classification Search
    USPC .......................................................... 180/439
    See application file for complete search history.

(56) References Cited

FOREIGN PATENT DOCUMENTS

| | | |
|---|---|---|
| DE | 10351482 | 6/2005 |
| DE | 102006008436 | 11/2007 |
| DE | 102012105976 | 1/2014 |
| EP | 2272736 | 1/2011 |

\* cited by examiner

STEERING SYSTEM FOR A TRAILING AXLE OF A VEHICLE

BACKGROUND OF THE INVENTION

The present invention relates to the technical field of steering systems and in particular to a steering system for a trailing axle of a vehicle.

Heavy vehicles—in particular commercial vehicles—often have more than two axles, so-called trailing axles. If the trailing axles are formed rigidly, the vehicles have a large turning circle. Therefore, in addition to front axle steering, a steerable trailing axle is often additionally incorporated. The trailing axle in this case can be positively steered or adhesively steered, i.e. steered by the restoring movement of the wheels themselves. This additional trailing axle steering permits smaller curve radii, which means that higher maneuverability is achieved. In addition, the slip angle on the tires is reduced, which means that the tire wear of the vehicle is reduced.

Active steering of the trailing axle is desirable only at low speeds, however. At higher vehicle speeds, no steering of the trailing axle is desired, since this has a detrimental influence on stable travel. The trailing axle must be fixed, starting at a specific speed dependent on the vehicle, in order not to cause any unstable traveling condition.

In such systems, it is advantageous that, in the event of a failure or at higher travel speeds, the axle can be kept in the straight-ahead position.

The prior art is that the trailing axle is steered via a hydraulic cylinder. The oil is pumped via a pump, which is driven via the internal combustion engine, into one or the other cylinder chamber, depending on how the valves are controlled. Therefore, in particular during straight-ahead travel, in which the vehicle remains for a long time, the hydraulic pump would be driven continuously although this is not necessary. In this operating state, the hydraulics generate losses, which are not countered by any added value. This is contrary to the requirement for a lower fuel consumption of the vehicle.

The problem is solved by the steering pump not being driven via the internal combustion engine but via an electric motor. Since the electric motor can drive equally in both directions, by using a reversible pump one or the other cylinder chamber can be pressurized, depending on the direction of rotation.

In German patent DE 4414161 C1, a multi-axle steering system is described in which a master cylinder is activated. Depending on the position of the master cylinder on the front axle, the slave cylinder on the rear axle reacts. The disadvantage with this system, however, is the direct dependence on the respective position of the master cylinder. Thus, with this system, there is no possibility of exerting a speed-dependent influence on the rear axle.

DE 103 51 482 A1 shows a steering system in which a hydraulic steered vehicle rear axle having an additional blocking device is kept in the current position or steered back into a central position by adhesion steering and is then locked. However, this requires further components, needs additional installation space and is thus expensive.

DE 10 2006 008 436 A1 shows a mechanically coupled multi-axle steering system in which a steering force is applied to the additional steering axle only when the latter is also required to be active—that is to say when there is a steering angle. However, this system can be implemented only with very great outlay for a rear axle steering system which is to be blocked in straight-ahead travel, starting from a certain speed range.

Finally, DE 10 2012 105 976 A1 discloses a steering system for a trailing axle having an electronic control system, in which the steering of the trailing axle takes place independently of the front axle. The pump is driven via an electric motor, which means that the system operates in an energy-efficient manner. The blocking function is implemented in the simplest way in that, during the adhesion-driven return movement of the piston, hydraulic fluid is discharged from the working cylinder through a central borehole. Once the piston reaches this central borehole, it closes the latter and therefore blocks any further movement. Connected in the fluid connection between central borehole and pump is a valve which, in the working position, suppresses a fluid flow there. In the event of a fault, the valve is de-energized and then permits a fluid flow. This valve is implemented as a spool valve.

However, spool valves are susceptible to dirt. For example, metal particles floating about in the hydraulic fluid in the steering system can jam the piston.

The pump is connected to the two cylinder chambers of the working cylinder by a connecting line each. If the first cylinder chamber is filled with hydraulic fluid, the piston forces the hydraulic fluid out of the second cylinder chamber via the connecting line in the direction of the pump. The two connecting lines are therefore simultaneously feed and return line. The hydraulic fluid is practically always pushed to and fro in the circuit. As a result, a number of disadvantages arise, since air inclusions in the hydraulic fluid cannot be led out. In particular during the first filling, the system can be poorly vented. Furthermore, no filter can be incorporated in the circuit to filter dirt particles out of the hydraulic fluid, since the hydraulic fluid flows in both directions.

SUMMARY OF THE INVENTION

The object of the present invention is to provide a steering system for a trailing axle in which the aforementioned disadvantages are eliminated. Failure of the system by jamming of the valve piston or by line breakage is to be avoided. Furthermore, it is to be possible that the system can be vented simply and that the hydraulic fluid can be cleaned by filtering.

The object is achieved in that, instead of a spool valve, multiple poppet valves are used. These have the advantage that metal particles in the hydraulic fluid cannot impair the function of the valve but are swept out again. The poppet valves are incorporated in the housing and connected to the working cylinder via fixed stable lines. These fixed lines can be drilled oil channels in the housing or metal pipes running on the housing. As a result, a failure of the system by line breakage, which could occur in previous systems in which the components were connected to one another by hoses, is prevented.

The object is also achieved in that a return line from the working cylinder to an oil tank is now provided. The pump always sucks oil out of the oil tank first and leads the oil to the working cylinder. The working cylinder then pushes the oil via the return line to the tank again, where possible air inclusions can then settle. Therefore, the oil flow direction is defined unambiguously in each line. It is thus now also possible to incorporate filters in order to clean the oil of dirt particles.

DETAILED DESCRIPTION

Figure 1:
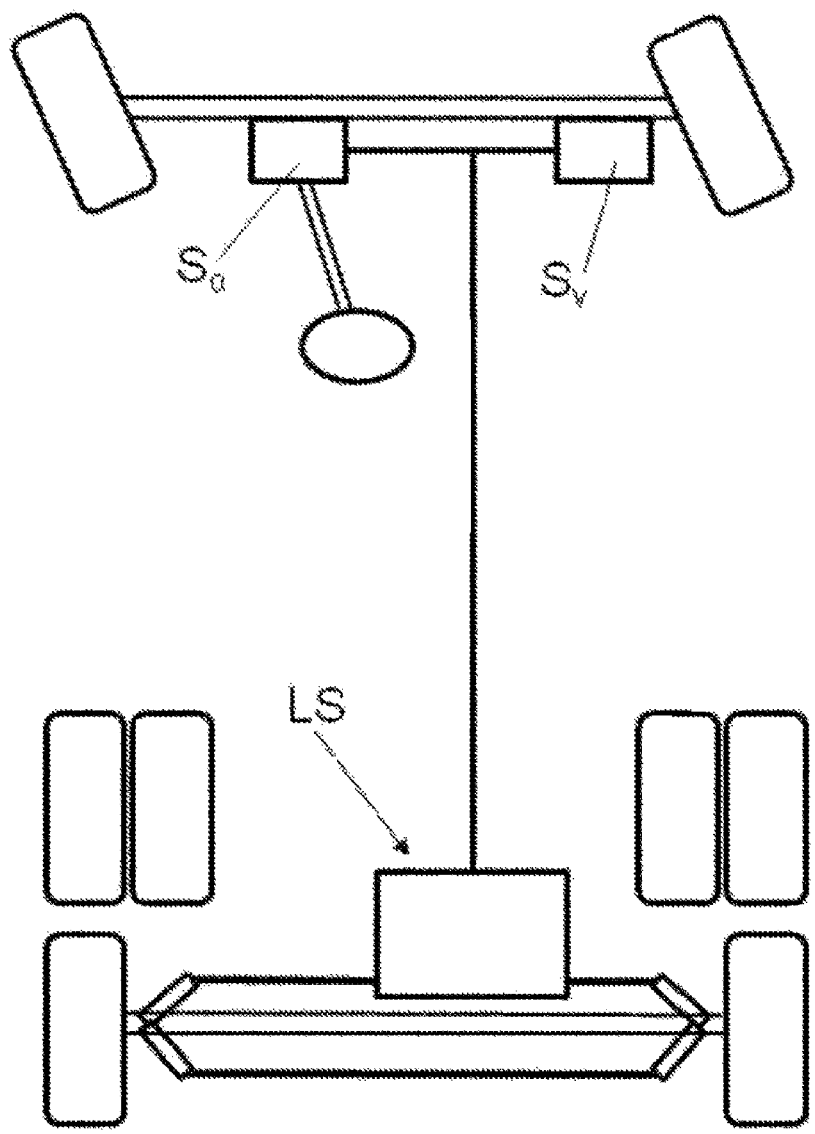
FIG. 1 shows a functional diagram of a vehicle. In order to detect a steering angle of wheels of a front axle, here a steering angle sensor $S_\alpha$ is provided and, to detect a driving speed v, a driving speed sensor $S_v$ is provided. The signals thereof are transmitted via a signal line to the steering system LS of the trailing axle.
Figure 2:
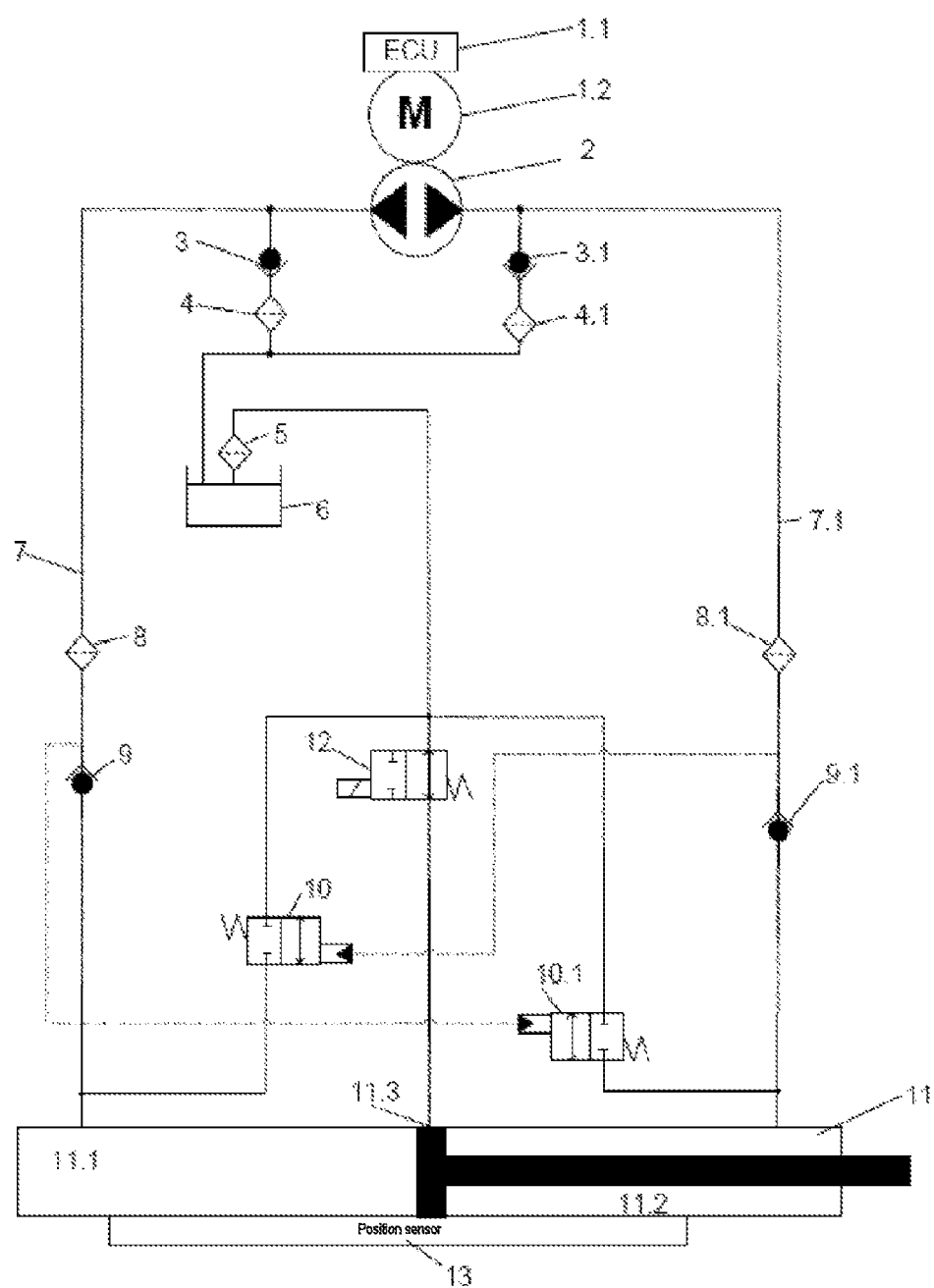
FIG. 2 shows the hydraulic circuit diagram of the overall steering system. The data determined by a steering angle sensor, which measures the steering angle of the front axle, and by a driving speed sensor, is input into a control device 1.1. The control device 1.1 calculates from the data a trailing angle of wheels on the trailing axle of the vehicle and activates an electric motor 1.2 appropriately.

The electric motor 1.2 serves to drive a hydraulic pump 2, which is in turn connected to at least one working cylinder 11 for steering the wheels of the trailing axle. The working cylinder 11 has a central borehole 11.3, via which hydraulic fluid can be discharged from the working cylinder 11, so that the piston, driven by adhesion, can be moved as far as a central position, in which it closes the central borehole and the wheels of the trailing axle are blocked in a straight-ahead position.

In this electrohydraulic steering system, the deflection of the trailing axle is carried out independently of the front axle, since the steering wheel is not connected mechanically to the axle to be steered. In addition, this system is decoupled from the internal combustion engine, so that, firstly, needs-based control and, secondly—as a result of the few and additionally freely placeable components—high spatial flexibility during its installation is ensured. At low speeds and at a standstill, active steering dependent on the steering angle of the front axle and on the driving speed is possible with this system. In particular, even in the event of failure of the electronics and/or of the hydraulics, the wheels of the trailing axle can at any time be moved automatically, i.e. driven by adhesion, from any deflection angle into their straight-ahead position and also reliably blocked there, without any additional electronics and/or hydraulics being necessary for this purpose.

During the adhesion-driven movement of the piston in the direction of the central borehole, the hydraulic fluid is discharged out of a cylinder chamber in the direction of the oil tank while, in the other cylinder chamber—without the use of the pump—fluid is drawn in. As soon as the central borehole is closed by the piston, further movement of the latter is blocked by the hydraulic fluid which, so to speak, is blocked in on both sides, so that the wheels of the trailing axle are kept securely in their straight-ahead position. In the event of a failure of the hydraulics and/or electrics at low speed, there is the possibility that the trailing axle will thus be moved into the central position in a damped manner, steered by adhesion, and will be kept there.

Here, trailing axle is to be understood to mean any axle which follows the deflection of a steered axle and which can be arranged to trail or lead a rigid rear or front axle, that is to say also as a leading axle. The steering system according to the invention can therefore also be used in trailers, semitrailers or a second steered front axle. The steering system according to the invention has a valve which is connected in a fluid connection between the central borehole and the oil tank and which, in a basic position, enables a fluid flow between the central borehole of the working cylinder and the oil tank, and which, in a working position, suppresses a fluid flow between the central borehole of the working cylinder and the oil tank, and in which the control device is designed to detect faults and, in the event of a fault, to switch the valve into its basic position, so the piston, driven by adhesion, can be moved as far as its central position, in which the piston closes the central borehole and the wheels of the trailing axle are blocked in a straight-ahead position. In the event of a failure, e.g. of the pump, the system can be transferred into a safe state by appropriate switching of the valve. While the valve, for example in fault free operation of the steering system, is in its working position, in which the piston can be moved only by the pump, when a fault occurs, it can permit its movement into the central position by opening the central borehole. In this basic position, the valve is de-energized and can thus be held without energy and thus particularly reliably, the deactivated pump also no longer needing any additional energy. The central position of the piston can be held reliably, since said piston closes the central borehole of the cylinder and further escape of hydraulic fluid is no longer possible.

The control device in this case can be designed to de-energize the motor as well when a predefinable driving speed is exceeded. Starting from a certain presettable speed, the trailing axle is therefore moved into its central position automatically, i.e. driven by adhesion, and is kept there, so that the wheels thereof are in the straight-ahead position. Since this central position can be held without further expenditure of energy, the power consumption of the system is minimal.

In a preferred way, the pump is implemented as a reversibly operable pump or as a combination of a pump that can be operated in one direction with a valve block. A reversibly operable pump in this case places the lowest requirements on the space required by the steering system, while a pump that can be operated in one direction needs a simpler electric drive.

The pump 2 sucks oil out of the oil container 6 via the feeder valves 3, 3.1. Since there can be coarse dirt in the oil tank 6, two filters 4, 4.1 are arranged in the suction line as a safeguard.

During the steering operation, the pump 2 delivers oil into a cylinder chamber 11.1, 11.2 via the feed line 7, 7.1, through the filters 8, 8.1 and the nonreturn valves 9, 9.1.

Each cylinder chamber 11.1, 11.2 is assigned a return flow valve 10, 10.1, which is closed when filling the cylinder chamber 11.1, 11.2. As a result of the pressure build-up in a cylinder chamber 11.1, 11.2, the return flow valve 10, 10.1 of the respective other of the cylinder chambers 11.1, 11.2 is opened and, as a result, the return flow from the other cylinder chamber 11.1, 11.2 through the filter 5 to the tank 6 is made possible.

The central position valve 12 has a defined flow cross section for the opened switching position, by which means the reset speed of the trailing axle can be set accurately.

The various operating states will be described below.

Straight-ahead Travel, Higher Driving Speed

During straight-ahead travel at a higher driving speed, the trailing axle is not steered but must be kept in the straight-ahead position. Here, the axle can be held actively by the motor, but this consumes energy.

Preferably, therefore, the axle is held by oil enclosed in the cylinders 11. Here, the axle is led back actively by the motor to the straight-ahead travel position and the steering system is then switched to passive, i.e. the central position valve 12 is closed and thus, together with the nonreturn valves 9 and 9.1, blocks the cylinder chambers. The advantage here is that no more energy is needed from the motor.

Active Steering, Low Driving Speed

During active steering, the steering angle of the front axle is detected by measurement and transmitted to the control device 1.1 of the rear axle steering. Using these and further parameters, for example the vehicle speed, the set point of the rear axle is calculated and the motor 1.2 is activated by the control device 1.1. The actual value is detected via the position sensor 13 and used for control.

The latter drives a reversible pump 2 directly. This delivers, for example in the direction of feed line 7, to the cylinder side 11.1. The pump 2 always sucks filtered oil out of the oil container 6 via the feeder valves 3 and 3.1. As a result of the pressure build-up in cylinder chamber 11.1, the return flow valve 10.1 is switched and the return flow from cylinder chamber 11.2 through the filter 5 to the tank 6 is made possible.

The motor 1 is activated by an appropriate control algorithm until the set point of the rear axle is reached.

Failure of the Steering System

If a failure of the steering system occurs (e.g. a fault in the motor 1.2, sensor 13 or the control device 1.1), motor 1.2 is switched off, the central position valve 12 goes into its basic position and the axle is guided back via the wheel forces and the desired damping via the central borehole 11.3 into the straight-ahead travel position, i.e. safe state. There the axle is held as explained below.

Failure during Straight-ahead Travel, Higher Driving Speed

If the system fails during straight-ahead travel, then this has no effect, since the piston seal has closed the central position borehole and the nonreturn valves 9 and 9.1 permit no return flow of the oil out of the cylinder 11, i.e. cylinder is hydraulically blocked.

Failure during Assisted Steering, Low Driving Speed

If the system fails during active steering, then the magnet of the central position valve 12 is de-energized, as a result of which it assumes its basic position. If the piston is in the straight-ahead travel position, then it can no longer be moved further—accordingly the axle remains held.

If the axle is deflected, then in many cases of faults, there is no possibility of moving the axle actively into the central position. When travelling through a curve, the de-energization of the central position valve 12 prevents the axle being deflected further than it is at this moment. The axle restoring forces attempt to move the cylinder in the direction of straight-ahead travel; this movement is made possible by the central position borehole 11.3 in the cylinder, until the piston reaches the central position. After reaching the central position, the axle is kept in this position, since the piston closes the central position borehole 11.3.

The rate of axle movement in the event of the failure can be set by means of the central position borehole 11.3 or a throttle in the central position valve 12 such that no critical travelling condition arises.

For the reverse movement of the piston in the direction of the central position, oil must be fed from the tank 6. This is carried out via the feeder valves 3 and 3.1 and the nonreturn valves 9 and 9.1.

LIST OF DESIGNATIONS

1.1 Control device
1.2 Electric motor
2 Pump
3/3.1 Feeder valve
4/4.1 Filter
5 Filter
6 Tank
7/7.1 Feed line
8/8.1 Filter
9/9.1 Nonreturn valve
10/10.1 Return flow valve
11 Working cylinder
11.1/11.2 Cylinder chamber
11.3 Central position borehole
13 Position sensor

The invention claimed is:

1. A steering system for a trailing or a leading axle of a vehicle, comprising:
   a steering angle sensor for measuring a steering angle of wheels of a front axle of the vehicle,
   a driving speed sensor for measuring a driving speed of the vehicle,
   an electric motor (1.2), which drives a hydraulic pump (2),
   a working cylinder (11) for steering wheels of the trailing axle, which working cylinder is connected to the hydraulic pump (2) via feed lines (7 and 7.1),
   a control device (1.1) which receives data from the steering angle sensor and the driving speed sensor, wherein the control device uses the data to determine a trailing angle of wheels on the trailing axle of the vehicle and activates the electric motor accordingly, and wherein
   the working cylinder (11) has a central position borehole (11.3), via which hydraulic fluid can be discharged from the working cylinder (11) and, in a straight-ahead position of the wheels of the trailing axle, a piston closing the central position borehole (11.3),
   the working cylinder (11) is connected to return flow valves (10 and 10.1), via which hydraulic fluid can flow back into a tank (6),
   the central position borehole (11.3) of the working cylinder (11) is connected to a central position valve (12), via which hydraulic fluid can flow back into a tank (6), and
   the return flow valves (10 and 10.1) and the central position valve (12) are poppet valves.

2. The steering system as claimed in claim 1,
characterized in that
a filter (5) for cleaning the hydraulic fluid is arranged in a return flow line from the working cylinder (11) to the tank (6).

3. The steering system as claimed in claim 2,
characterized in that
filters (4 and 4.1) are arranged in suction lines.

4. The steering system as claimed in claim 3,
characterized in that
filters (8 and 8.1) are arranged in the feed lines (7 and 7.1).

5. The steering system as claimed in claim 1, characterized in that filters (4 and 4.1) are arranged in suction lines.

6. The steering system as claimed in claim 1, characterized in that filters (8 and 8.1) are arranged in the feed lines (7 and 7.1).

* * * * *